United States Patent
Shtrom et al.

(10) Patent No.: US 9,497,717 B2
(45) Date of Patent: Nov. 15, 2016

(54) OUT-OF-BAND ACKNOWLEDGEMENT OF WIRELESS COMMUNICATION

(71) Applicant: Ruckus Wireless, Inc., Sunnyvale, CA (US)

(72) Inventors: Victor Shtrom, Los Altos, CA (US); William S. Kish, Saratoga, CA (US)

(73) Assignee: Ruckus Wireless, Inc., Sunnyvale, CA (US)

( * ) Notice: Subject to any disclaimer, the term of this patent is extended or adjusted under 35 U.S.C. 154(b) by 10 days.

(21) Appl. No.: 14/286,854

(22) Filed: May 23, 2014

(65) Prior Publication Data

US 2015/0341879 A1 Nov. 26, 2015

(51) Int. Cl.
*H04W 56/00* (2009.01)
*H04L 1/12* (2006.01)
*H04W 52/02* (2009.01)
*H04W 74/00* (2009.01)
*H04W 74/04* (2009.01)
*H04W 74/08* (2009.01)
*H04W 88/06* (2009.01)

(52) U.S. Cl.
CPC ............ *H04W 56/0005* (2013.01); *H04L 1/12* (2013.01); *H04W 52/0212* (2013.01); *H04W 52/0229* (2013.01); *H04W 74/006* (2013.01); *H04W 74/04* (2013.01); *H04W 74/0833* (2013.01); *H04W 88/06* (2013.01)

(58) Field of Classification Search
None
See application file for complete search history.

(56) References Cited

U.S. PATENT DOCUMENTS

| | | | | | |
|---|---|---|---|---|---|
| 3,626,382 | A | * | 12/1971 | Pedersen | G06F 13/4022 358/1.1 |
| 5,847,662 | A | * | 12/1998 | Yokota | G06K 7/0008 340/10.31 |
| 6,463,039 | B1 | * | 10/2002 | Ricci | G06K 7/10861 340/10.3 |
| 6,915,079 | B1 | * | 7/2005 | Unitt | H04B 10/272 398/100 |
| 7,020,277 | B1 | * | 3/2006 | Lee | H04L 25/0266 379/391 |
| 7,154,845 | B1 | * | 12/2006 | Barrass | H04B 3/487 370/201 |
| 7,230,541 | B2 | * | 6/2007 | Ripolone | G01V 11/002 166/65.1 |
| 7,336,626 | B1 | * | 2/2008 | Barratt | H04B 7/12 370/281 |

(Continued)

FOREIGN PATENT DOCUMENTS

WO 2014-061998 A1 4/2014

*Primary Examiner* — Bunjob Jaroenchonwanit
(74) *Attorney, Agent, or Firm* — Downey Brand LLP

(57) ABSTRACT

Power consumption in a receiving device is avoided by receiving packets from a transmitting device in a first band of frequencies (such as around 60 GHz) and providing acknowledgments in a second band of frequencies that is different than the first band of frequencies (such as around 5 GHz). These out-of-band acknowledgments may allow the receiving device to avoid transmissions in the first band of frequencies and the associated power consumption. Moreover, the transmissions by the transmitting device in the first band of frequencies and the second band of frequencies may be synchronized so that packets are transmitted in the first band of frequencies when transmission in the second band of frequencies is enabled. In these ways, this communication technique may improve the performance of the transmitting device and the receiving device.

30 Claims, 8 Drawing Sheets

(56) References Cited

U.S. PATENT DOCUMENTS

| | | | | |
|---|---|---|---|---|
| 8,005,038 B2* | 8/2011 | Yeh | H04N 1/00281 | 370/328 |
| 8,676,221 B2* | 3/2014 | Nagaraja | H04L 5/0007 | 455/446 |
| 8,917,697 B2* | 12/2014 | Miki | H04L 5/0053 | 370/310 |
| 2002/0173272 A1* | 11/2002 | Liang | H04W 72/1215 | 455/63.1 |
| 2004/0125820 A1* | 7/2004 | Rios | H04W 40/02 | 370/480 |
| 2005/0083180 A1* | 4/2005 | Horwitz | G06K 7/10297 | 340/10.4 |
| 2005/0176452 A1* | 8/2005 | Perlman | H04W 88/08 | 455/500 |
| 2005/0256963 A1* | 11/2005 | Proctor, Jr. | H04B 7/15528 | 709/230 |
| 2006/0019612 A1* | 1/2006 | Obara | H04B 1/50 | 455/78 |
| 2008/0279125 A1* | 11/2008 | Hottinen | H04B 7/2615 | 370/281 |
| 2008/0298356 A1* | 12/2008 | Deng | H04B 7/12 | 370/389 |
| 2009/0029715 A1* | 1/2009 | Burchardt | H04W 64/00 | 455/456.1 |
| 2009/0097423 A1* | 4/2009 | Choi | H04W 72/0453 | 370/280 |
| 2009/0135084 A1* | 5/2009 | Huang | H01Q 9/285 | 343/893 |
| 2011/0080196 A1* | 4/2011 | Wang | H03L 7/103 | 327/156 |
| 2011/0164538 A1* | 7/2011 | Karr | H04W 72/082 | 370/281 |
| 2012/0164963 A1* | 6/2012 | Rofougaran | H03G 1/0029 | 455/127.2 |
| 2012/0176233 A1* | 7/2012 | Petrucelli | B60C 23/0401 | 340/447 |
| 2012/0220244 A1* | 8/2012 | Georgantas | H03G 3/3042 | 455/91 |
| 2012/0243494 A1* | 9/2012 | Trachewsky | H04W 48/20 | 370/329 |
| 2014/0081793 A1* | 3/2014 | Hoffberg | G06Q 30/0207 | 705/26.3 |
| 2014/0233440 A1* | 8/2014 | Karr | H04W 72/082 | 370/281 |
| 2014/0330992 A1* | 11/2014 | Li | G06F 13/10 | 710/33 |
| 2014/0349608 A1* | 11/2014 | Li | H04L 9/0827 | 455/410 |
| 2015/0163808 A1* | 6/2015 | Seibert | H04W 72/0453 | 370/329 |
| 2015/0318836 A1* | 11/2015 | Basaran | H03H 7/12 | 375/219 |

* cited by examiner

OUT-OF-BAND ACKNOWLEDGEMENT OF WIRELESS COMMUNICATION

BACKGROUND

1. Field

The described embodiments relate to techniques for communicating information in a wireless network. In particular, the described embodiments relate to techniques for providing feedback about communication in one band of frequencies through a different band of frequencies.

2. Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless network.

Because of the increasing popularity of wireless communication, existing bands of frequencies (or frequency bands) that are used for communication are becoming crowded. This results in conflicts and collisions, which can degrade throughput and, more generally, communication performance. To address this problem, communication protocols that use an additional band of frequencies have been proposed. For example, communication protocols compatible with IEEE 802.11 standards (such as IEEE 802.11a, IEEE 802.11b, IEEE 802.11g, IEEE 802.11n and IEEE 802.11ac) typically communicate information using channels in bands of frequencies around 2.4 or 5 GHz. Recently, communication using a band of frequencies around 60 GHz has been proposed (e.g., in IEEE 802.11ad).

However, networking subsystems based on the IEEE 802.11 standards typically have high power consumption. Because power amplifiers that are used to transmit signals are less efficient at 60 GHz, the power consumption associated with IEEE 802.11ad is expected to be even higher. This additional power consumption may be a challenge in portable electronic devices (such as cellular telephones) in which battery life is already a concern and, thus, may restrict use of the additional band of frequencies.

SUMMARY

The described embodiments include a transmitting device that includes: an antenna; and an interface circuit that communicates with a receiving device. During operation, the interface circuit: transmits a data packet to the receiving device in a first band of frequencies; and receives feedback from the receiving device about the communication of the data packet in a second band of frequencies that is different than the first band of frequencies. Moreover, the transmitting in the first band of frequencies and the receiving in the second band of frequencies involve separate radio circuits in the interface circuit, and the transmitting in the first band of frequencies and the receiving in the second band of frequencies involve different physical layer communication protocols.

Note that the feedback may include a channel-access procedure. For example, the channel-access procedure may include conflict-avoidance information for communication in the second band of frequencies. Additionally, communicating the feedback may involve scheduled access or random access to the second band of frequencies (e.g., a contention-based protocol such as listen before talk).

Moreover, the transmitting in the first band of frequencies may be synchronized with the transmitting in the second band of frequencies so that the data packet is transmitted when transmitting in the second band of frequencies is enabled.

Furthermore, the second band of frequencies may include interference sources during communication between the transmitting device and the receiving device, and the first band of frequencies may exclude the interference sources during communication between the transmitting device and the receiving device. In some embodiments, frequencies in the first band of frequencies are higher than frequencies in the second band of frequencies.

Another embodiment provides a communication circuit. This communication circuit includes: a node that can couple to an antenna; and an interface circuit. This communication circuit may perform operations performed by the transmitting device.

Another embodiment provides a method for communicating between the transmitting device and the receiving device. This method includes at least some of the operations performed by the transmitting device.

Another embodiment provides the receiving device that includes: an antenna; and an interface circuit that communicates with the transmitting device. During operation, the interface circuit: receives the data packet from the transmitting device in the first band of frequencies; and transmits the feedback to the transmitting device about the communication of the data packet in the second band of frequencies that is different than the first band of frequencies. Moreover, the receiving in the first band of frequencies and the transmitting in the second band of frequencies involve separate radio circuits in the interface circuit, and the receiving in the first band of frequencies and the transmitting in the second band of frequencies involve different physical layer communication protocols.

Another embodiment provides a communication circuit. This communication circuit includes: a node that can couple to an antenna; and an interface circuit. This communication circuit may perform operations performed by the receiving device.

Another embodiment provides a method for communicating between the transmitting device and the receiving device. This method includes at least some of the operations performed by the receiving device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Power consumption in a receiving device is avoided by receiving packets from a transmitting device in a first band of frequencies (such as around 60 GHz) and providing acknowledgments in a second band of frequencies that is different than the first band of frequencies (such as around 5 GHz). These out-of-band acknowledgments may allow the receiving device to avoid transmissions in the first band of frequencies and the associated power consumption. Moreover, the transmissions by the transmitting device in the first band of frequencies and the second band of frequencies may be synchronized so that packets are transmitted in the first band of frequencies when transmission in the second band of frequencies is enabled. By reducing the power consumption of the receiving device while offering the added capacity and throughput associated with the first band of frequencies, this communication technique may improve the performance of the transmitting device and the receiving device, and thus may improve the user experience when using the transmitting device and/or the receiving device.

In the discussion that follows the transmitting and the receiving devices include radios that communicate packets in accordance with a communication protocol, such as an Institute of Electrical and Electronics Engineers (IEEE) 802.11 standard (which is sometimes referred to as 'Wi-Fi®,' from the Wi-Fi Alliance of Austin, Tex.), Bluetooth (from the Bluetooth Special Interest Group of Kirkland, Wash.), and/or another type of wireless interface. In the discussion that follows, Wi-Fi (and, in particular, IEEE 802.11ad) is used as an illustrative example. However, a wide variety of communication protocols may be used.

Figure 1:
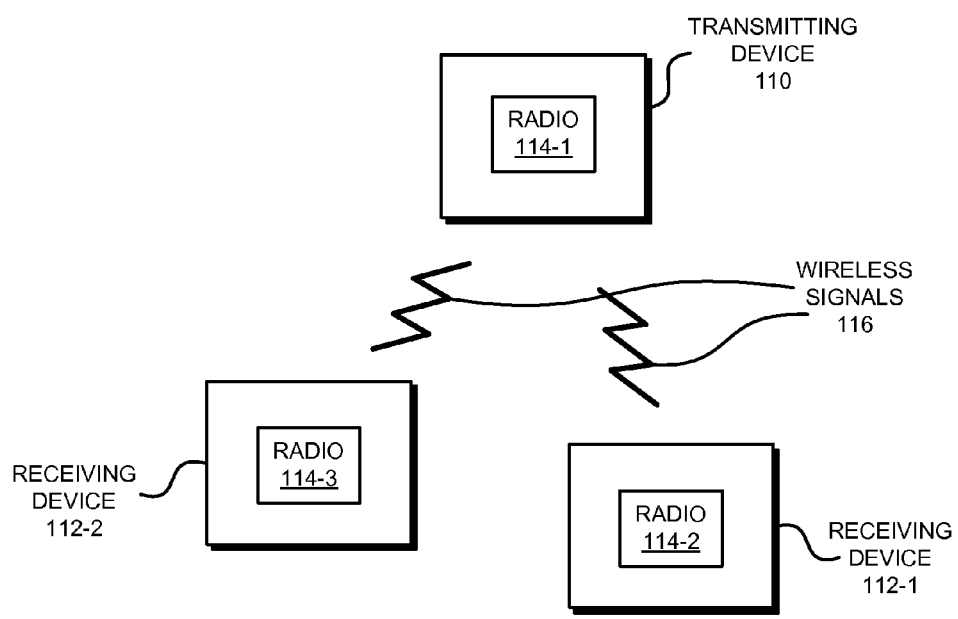
FIG. 1 is a block diagram illustrating electronic devices wirelessly communicating in accordance with embodiments of the present disclosure.

Communication among electronic devices is shown in FIG. 1, which presents a block diagram illustrating transmitting device 110 (such as an access point) and one or more receiving devices 112 (such as portable electronic devices, e.g., cellular telephones) wirelessly communicating. In particular, these electronic devices may wirelessly communicate while: transmitting advertising frames on wireless channels, detecting one another by scanning wireless channels, establishing connections (for example, by transmitting association requests), and/or transmitting and receiving packets (which may include the association requests, feedback about the communication and/or additional information as payloads).

Figure 7:
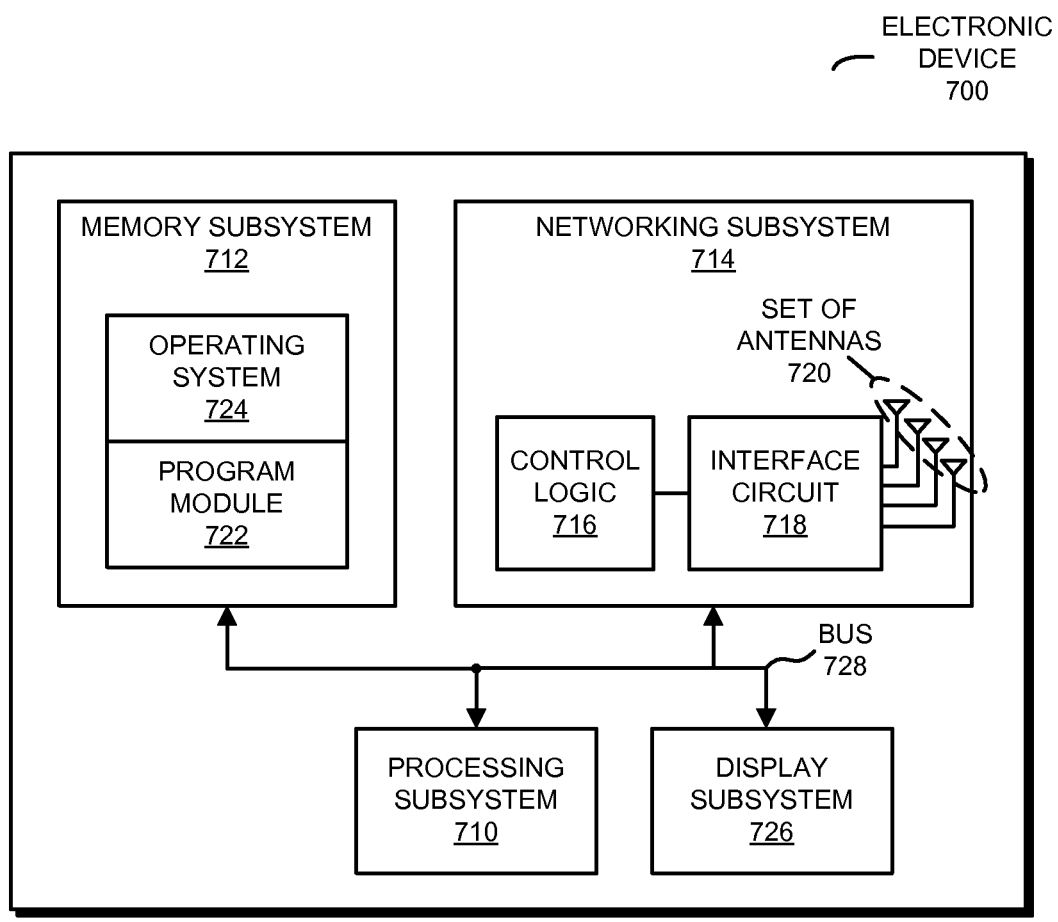
FIG. 7 is a block diagram illustrating one of the electronic devices of FIG. 1 in accordance with embodiments of the present disclosure.

As described further below with reference to FIG. 7, transmitting device 110 and the one or more receiving devices 112 may include subsystems, such as a networking subsystem, a memory subsystem and a processor subsystem.

In addition, transmitting device 110 and the one or more receiving devices 112 may include radios 114 in the networking subsystems. More generally, transmitting device 110 and the one or more receiving devices 112 can include (or can be included within) any electronic devices with the networking subsystems that enable transmitting device 110 and the one or more receiving devices 112 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc.

As can be seen in FIG. 1, wireless signals 116 (represented by jagged lines) are transmitted from a radio 114-1 in transmitting device 110. These wireless signals 116 are received by radios 114 in the one or more receiving devices 112. In particular, transmitting device 110 may transmit packets. In turn, these packets may be received by at least the one of receiving devices 112. This may allow transmitting device 110 to communicate information to receiving devices 112. Note that the communication between transmitting device 110 and a given one of receiving devices 112 (such as receiving device 112-1) may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). In some embodiments, the communication between transmitting device 110 and a given one of receiving devices 112 is characterized by an error-rate model, which compares the error rate during communication at the data rate.

The networking subsystems in transmitting device 110 and the one or more receiving devices 112 may be configured to communicate information (such as packets) in a first band of frequencies and a second band of frequencies. In general, these bands of frequencies may or may not be continuous (e.g., a given band of frequencies may include multiple channels that may or may not be contiguous), and may or may not overlap (at least in part) each other. In an exemplary embodiment the bands of frequencies are different (i.e., do not overlap) and the first band of frequencies is higher than the second band of frequencies (e.g., the center frequency in the first band of frequencies is higher than the center frequency in the second band of frequencies). For example, the first band of frequencies may be a so-called 60 GHz band of frequencies and the second band of frequencies may be a so-called 5 GHz band of frequencies. However, the communication technique may be used with other bands of frequencies (e.g., separately or in conjunction with the 5 GHz band of frequencies, the second band of frequencies may include a so-called 2.4 GHz band).

As noted previously, one problem associated with use of the 60 GHz band is the increased power consumption of power amplifiers. In this case of portable electronic devices (such as receiving devices 112) transmitting in the 60 GHz band could significantly increase power consumption. As described further below with reference to FIGS. 2 and 3, in order to avoid this problem, while preserving the enhanced capacity and throughput offered by the 60 GHz band, transmitting device 110 may transmit packets to the one or more receiving devices 112 using the first band of frequencies and the second band of frequencies. However, a given one of receiving devices 112 (such as receiving device 112-1) may receive packets in the first band of frequencies and the second band of frequencies, but may only transmit packets using the second band of frequencies. For example, if a data packet is successfully received in the first band of frequencies, receiving device 112-1 may transmit an acknowledgment (and, more generally, feedback about the communication) to transmitting device 110 in the second band of frequencies (i.e., using out-of-band communication). Moreover, as described further below with reference to FIG. 5, during this communication technique transmissions in the first band of frequencies and the second band of frequencies may be synchronized (i.e., transmitting of packets in the first band of frequencies may occur when transmitting in the second band of frequencies is enabled).

In addition to communicating acknowledgments (or block acknowledgments in embodiments where multiple subframes are aggregated), the second band of frequencies may be used to manage the communication in the first band of frequencies. In the case of Wi-Fi, the second band of frequencies may be used to convey (i.e., via bidirectional communication) basic-service-set operations, such as probe, association and authentication messages, and thus may be used to establish a connection or association between transmitting device 110 and a given one of receiving devices 112.

Furthermore, the second band of frequencies may be used to convey control or action frames, such as beamforming or beam-pattern information (which may be used to determine beam-pattern settings for a set of antennas in transmitting device 110 and/or a given one of receiving devices 112), conflict-avoidance information for communication in the first band of frequencies and/or the second band of frequencies and, more generally, information associated with a channel-access procedure.

In contrast, the first band of frequencies may be used for unidirectional communication of packets from transmitting device 110 to the one or more receiving devices 112. Thus, the first band of frequencies may not convey the information associated with the channel-access procedure between transmitting device 110 and a given one of receiving devices 112 (such as messages that specify a backoff time or a channel access time during communication).

This may be possible because the first band of frequencies is higher than the second band of frequencies. In particular, the second band of frequencies may represent a more congested environment than the first band of frequencies. In addition, the first band of frequencies may involve line-of-sight communication between transmitting device 110 and a given one of receiving devices 112. Furthermore, the second band of frequencies may include interference sources during communication between transmitting device 110 and the given one of receiving devices 112, and the first band of frequencies may exclude these interference sources.

Note that the transmitting in the first band of frequencies and the receiving in the second band of frequencies may involve separate radio circuits in radio 114-1 in transmitting device 110, as well as different physical layer communication protocols. For example, the transmitting may involve IEEE 802.11ad and the receiving may involve another IEEE 802.11-compatible communication protocol. Similarly, from the perspective of the one or more receiving devices 112, the receiving in the first band of frequencies and the transmitting in the second band of frequencies may involve separate radio circuits in radios 114, as well as the different physical layer communication protocols. Thus, for the one or more receiving devices 112 the receiving may involve IEEE 802.11ad and the transmitting may involve the other IEEE 802.11-compatible communication protocol.

In the described embodiments, processing a packet or frame in transmitting device 110 and/or receiving devices 112 includes: receiving wireless signals 116 with the packet or frame; decoding/extracting the packet or frame from received wireless signals 116 to acquire the packet or frame; and processing the packet or frame to determine information contained in the packet or frame (such as the feedback, etc.).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
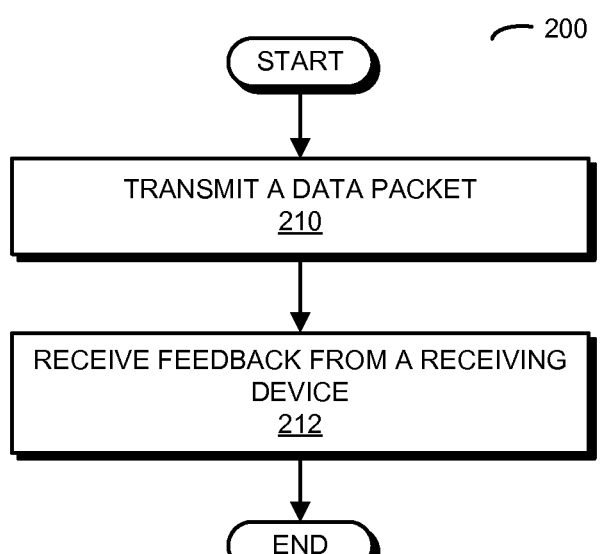
FIG. 2 is a flow diagram illustrating a method for communicating between a transmitting device and a receiving device during communication among the electronic devices in FIG. 1 in accordance with embodiments of the present disclosure.

FIG. 2 presents a flow diagram illustrating method 200 for communicating between a transmitting device and a receiving device, which may be implemented by the transmitting device and/or a communication circuit in the transmitting device. For example, the transmitting device may be transmitting device 110 (FIG. 1).

During operation, the transmitting device transmits a data packet (operation 210) to the receiving device in the first band of frequencies. Then, the transmitting device receives feedback from the receiving device (operation 212) about communication of the data packet in the second band of frequencies that is different than the first band of frequencies.

Figure 3:
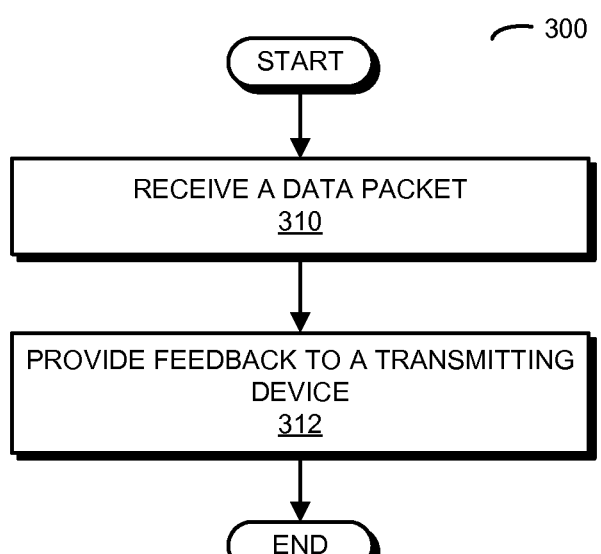
FIG. 3 is a flow diagram illustrating a method for communicating between a transmitting device and a receiving device during communication among the electronic devices in FIG. 1 in accordance with embodiments of the present disclosure.

FIG. 3 presents a flow diagram illustrating method 300 for communicating between the transmitting device and the receiving device, which may be implemented by the receiving device and/or a communication circuit in the receiving device. For example, the receiving device may be one of receiving devices 112 (FIG. 1).

During operation, the receiving device receives the data packet (operation 310) from the transmitting device in the first band of frequencies. Then, the receiving device transmits the feedback to the transmitting device (operation 312) about communication of the data packet in the second band of frequencies that is different than the first band of frequencies.

In these ways, the transmitting device (for example, an interface circuit in the transmitting device) may facilitate high capacity or high throughput communication with the receiving device, while reducing the power consumption of the receiving device. Consequently, this communication technique may facilitate high performance communication between the transmitting device and the receiving device.

In some embodiments of methods 200 (FIG. 2) and/or 300, there may be additional or fewer operations. Additionally, the order of the operations in methods 200 (FIG. 2) and/or 300 may be changed, and/or two or more operations may be combined into a single operation. Note that communicating the feedback in method 200 (FIG. 2) and/or 300 may involve scheduled access or random access to the second band of frequencies (e.g., a contention-based protocol such as listen before talk).

In an exemplary embodiment, Wi-Fi operating in the 5 GHz band of frequencies is augmented using Wi-Fi operating in the unlicensed 60 GHz band of frequencies or spectrum. However, existing approaches involve running a complete Wi-Fi basic service set in the 60 GHz spectrum.

The disclosed communication technique provides a simpler, cheaper and lower power-consumption alternative for portable electronic devices. In this communication technique, the 60 GHz spectrum is used as a downlink-only 'extension' channel to a primary basic service set in the 5 GHz band of frequencies. This 5 GHz channel may be used to communicate IEEE 802.11 media-access-control information (such as clear channel assessment, acknowledgment, beamforming information or feedback, etc.), while the 60 GHz spectrum is used in an opportunistic fashion to augment the capacity of the 5 GHz channel (e.g., use of the 60 GHz spectrum may be selectively enabled as needed based on the amount of data to be communicated, performance of the 5 GHz channel, etc.). In addition to simplicity, the communication technique does not require that a portable electronic device (such as one of receiving devices 112 in FIG. 1) transmit radio signals in the 60 GHz spectrum, which can result in substantial power savings.

Figure 4:
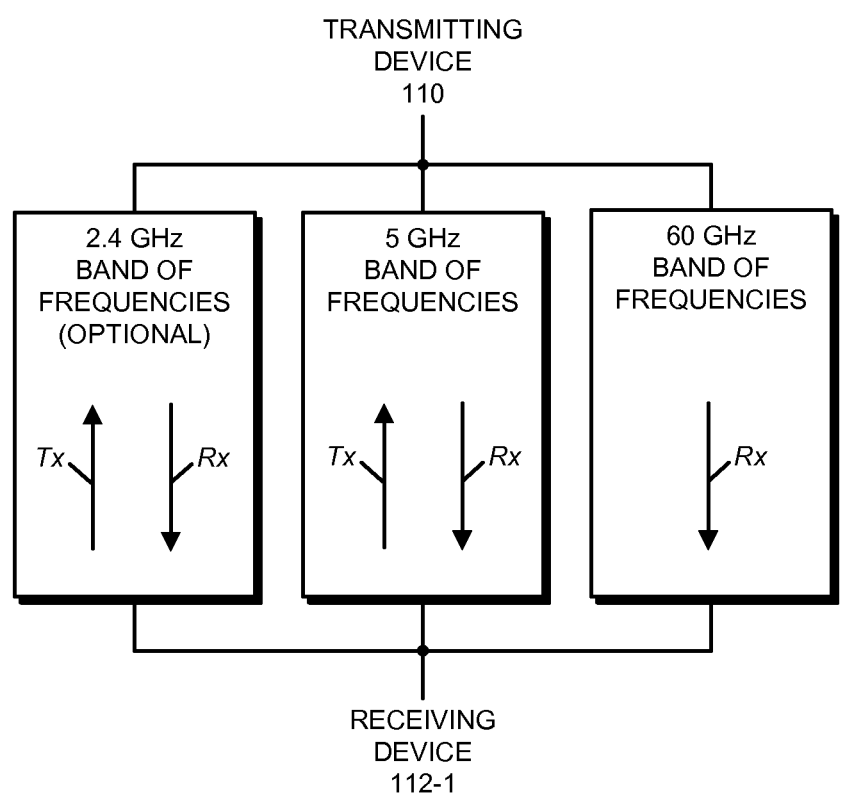
FIG. 4 is a drawing illustrating out-of-band acknowledgment of communication among the electronic devices in FIG. 1 in accordance with embodiments of the present disclosure.

An exemple of the communication technique is illustrated in FIG. 4, which presents a drawing showing out-of-band acknowledgment (in 5 GHz band of frequencies) of communication in the 60 GHz band of frequencies between transmitting device 110 and receiving device 112-1 (which is used as an illustrative example). In particular, as shown in FIG. 4, the optional 2.4 GHz band of frequencies and the 5 GHz band of frequencies may be used for transmitting (Tx) and receiving (Rx), while the 60 GHz band of frequencies may be used for receiving at receiving device 112-1.

Figure 5:
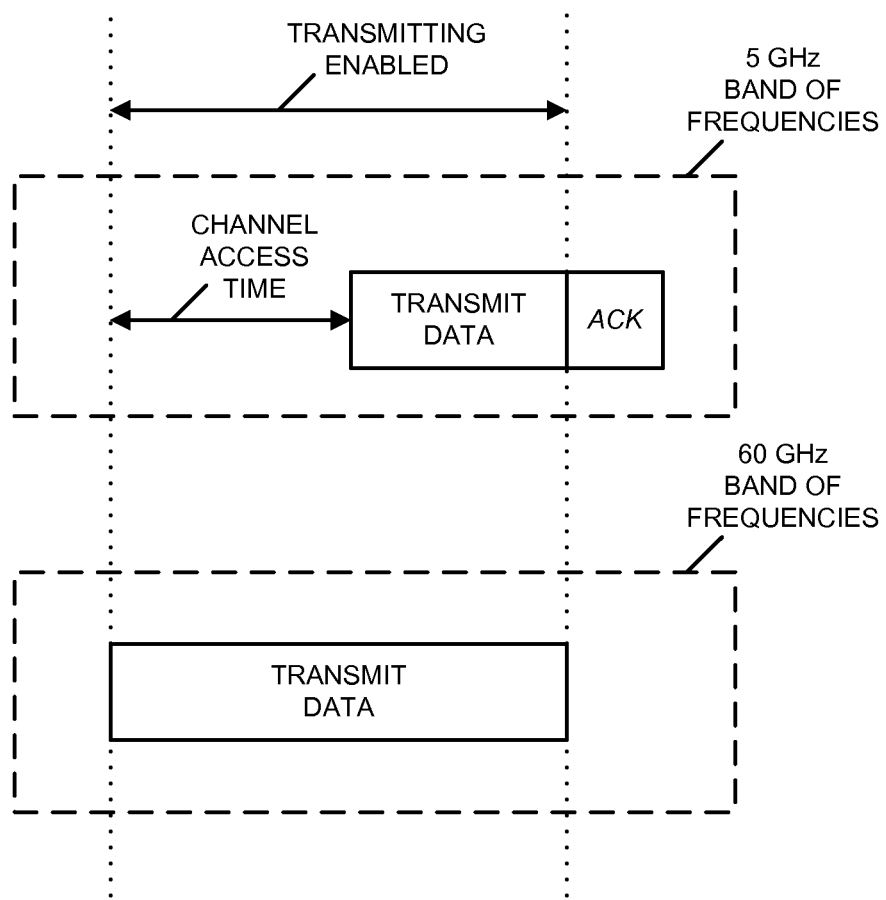
FIG. 5 is a timing diagram illustrating synchronization of communication in two bands of frequencies during communication among the electronic devices in FIG. 1 in accordance with embodiments of the present disclosure.

Because the 5 GHz band of frequencies is more crowded (i.e., is a more congested environment) and may include interference sources, the channel access time prior to transmitting one or more packets may vary from 100 µs to around 10 ms. In addition, in order to improve efficiency, often multiple frames or subframes are aggregated during transmission. This can result in transmission times of up to several milliseconds. However, the 60 GHz band of frequencies is less crowded than the 5 GHz band of frequencies and may exclude the interference sources. This may result in shorter channel access times. Furthermore, the high capacity and data rates associated with the 60 GHz band of frequencies may result in short transmit times. Consequently, the radio circuits and memory (such as first-in first-out buffers) associated with the 5 GHz band of frequencies and the 60 GHz band of frequencies may be synchronized. For example, the clocks associated with these radio circuits may be synchronized so that transmission of data in the 60 GHz band of frequencies occurs when transmission in the 5 GHz band of frequencies is enabled. In addition, this allows emptying of the memory buffer for the 5 GHz and the 60 GHz bands to be synchronized, and allows a common acknowledgement message to be used for both the 5 GHz and the 60 GHz bands. This synchronization is shown in FIG. 5, which presents a timing diagram illustrating synchronization of the communication in two bands of frequencies, including the out-of band acknowledgment (ACK) of the data transmitted in the 60 GHz band of frequencies communicated in the 5 GHz band of frequencies.

Figure 6:
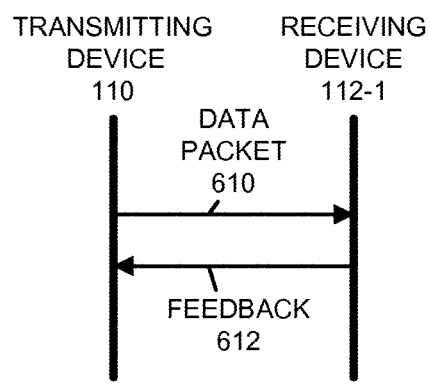
FIG. 6 is a drawing illustrating communication among the electronic devices in FIG. 1 in accordance with embodiments of the present disclosure.

The communication technique is further illustrated in FIG. 6, which presents a drawing illustrating communication between transmitting device 110 and one of receiving devices 112 in FIG. 1 (such as receiving device 112-1). In particular, transmitting device 110 may provide a data packet 610 to receiving device 112-1 via the first band of frequencies. After this data packet is received, receiving device 112-1 may provide feedback 612 (such as an acknowledgment or a block acknowledgment) to transmitting device 110 via the second band of frequencies.

We now describe embodiments of the electronic device. FIG. 7 presents a block diagram illustrating an electronic device 700, such as transmitting device 110 or one of receiving devices 112 in FIG. 1. This electronic device includes processing subsystem 710, memory subsystem 712, and networking subsystem 714. Processing subsystem 710 includes one or more devices configured to perform computational operations. For example, processing subsystem 710 can include one or more microprocessors, application-specific integrated circuits (ASICs), microcontrollers, programmable-logic devices, and/or one or more digital signal processors (DSPs).

Memory subsystem 712 includes one or more devices for storing data and/or instructions for processing subsystem 710 and networking subsystem 714. For example, memory subsystem 712 can include dynamic random access memory (DRAM), static random access memory (SRAM), and/or other types of memory. In some embodiments, instructions for processing subsystem 710 in memory subsystem 712 include: one or more program modules or sets of instructions (such as program module 722 or operating system 724), which may be executed by processing subsystem 710. Note that the one or more computer programs may constitute a computer-program mechanism. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718 and a set of antennas 720. For example, networking subsystem 714 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system. Note that in some embodiments set of antennas 720 includes multiple antenna elements in an adaptive array that can be selectively turned on and/or off by control logic 716 to create a variety of antenna patterns.

Networking subsystem 714 includes processors, controllers, radios or radio circuits (which communicate information using electromagnetic waves in the radio and/or microwave portions of the electromagnetic spectrum), power amplifier, antennas, sockets, plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 700 may use the mechanisms in networking subsystem 714 for performing simple wireless communication between the electronic devices, e.g., transmitting advertising or beacon frames and/or scanning for advertising frames transmitted by other electronic devices as described previously.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc.

Electronic device 700 can be (or can be included in) any electronic device with at least one network interface. For example, electronic device 700 can be (or can be included in): a desktop computer, a laptop computer, a subnotebook/netbook, a server, a tablet computer, a smartphone, a cellular telephone, a consumer-electronic device, a portable computing device, an access point, a router, a switch, communication equipment, test equipment, and/or another electronic device.

Although specific components are used to describe electronic device 700, in alternative embodiments, different components and/or subsystems may be present in electronic device 700. For example, electronic device 700 may include one or more additional processing subsystems 710, memory subsystems 712, networking subsystems 714, and/or display subsystems 726. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments program module 722 is included in operating system 724 and/or control logic 716 is included in interface circuit 718.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

Figure 8:
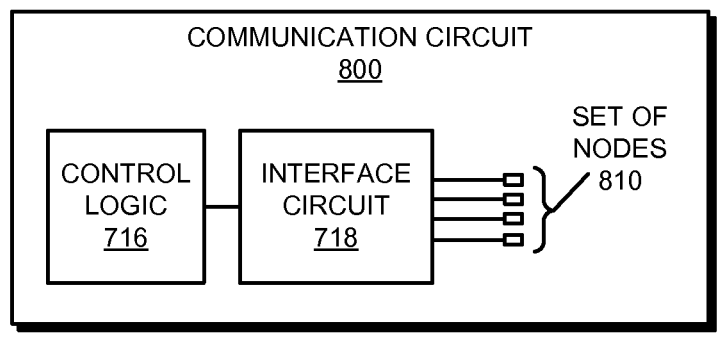
FIG. 8 is a block diagram illustrating a communication circuit for use in the one of the electronic devices in FIG. 1 in accordance with embodiments of the present disclosure.

An integrated circuit (which is sometimes referred to as a 'communication circuit') may implement some or all of the functionality of networking subsystem 714. This is illustrated in FIG. 8, which presents a block diagram of communication circuit 800. In particular, communication circuit 800 may include: control logic 716, an interface circuit 718 and set of nodes 810 that can couple to set of antennas 720 (FIG. 7). For example, set of nodes 810 may include at least one node (such as a pad).

Referring back to FIG. 7, the integrated circuit may include hardware and/or software mechanisms that are used for transmitting wireless signals from electronic device 700 and receiving signals at electronic device 700 from other electronic devices. For example, in the case of transmitting device 110 (FIG. 1), transmitting in the first band of frequencies and receiving in the second band of frequencies may involve separate radio circuits (as well as different physical layer communication protocols). Alternatively, in the case of one of receiving devices 112 (FIG. 1), receiving in the first band of frequencies and transmitting in the second band of frequencies may involve separate radio circuits (as well as the different physical layer communication protocols). Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While a communication protocol compatible with Wi-Fi was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the detection technique may be implemented using program module 722, operating system 724 (such as a driver for interface circuit 718) or in firmware in interface circuit 718. Alternatively or additionally, at least some of the operations in the communication technique may be implemented in a physical layer, such as hardware in interface circuit 718. For example, the synchronization between the transmitting in the first band of frequencies and the second band of frequencies may be implemented in hardware.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A transmitting device, comprising:
an antenna; and
an interface circuit, coupled to the antenna, configured to communicate with a receiving device, wherein the interface circuit comprises:
    a first radio circuit configured to transmit one or more packets over a first physical layer communication protocol; and
    a second radio circuit, which is separate from the first radio circuit, configured to receive one or more packets over a second physical layer communication protocol that is different from the first physical layer communication protocol; and wherein the interface circuit is further configured to:
    transmit, via the first radio circuit, a data packet to the receiving device in a first band of frequencies using the first physical layer communication protocol;
    synchronize the first radio circuit and the second radio circuit so that transmitting in the second band of frequencies is enabled concurrently with the transmitting of the data packet; and
    receive, via the second radio circuit, feedback from the receiving device about the communication of the data packet in a second band of frequencies using the second physical layer communication protocol.

2. The transmitting device of claim 1, wherein the feedback includes information associated with a channel-access procedure.

3. The transmitting device of claim 2, wherein the information includes conflict-avoidance information for communication in the second band of frequencies.

4. The transmitting device of claim 1, wherein the first radio circuit is configured for unidirectional communication with the receiving device in the first band of frequencies.

5. The transmitting device of claim 1, wherein the second band of frequencies includes interference sources during communication between the transmitting device and the receiving device; and
wherein the first radio circuit is configured to exclude the interference sources from the first band of frequencies during communication between the transmitting device and the receiving device.

6. The transmitting device of claim 1, wherein frequencies in the first band of frequencies are higher than frequencies in the second band of frequencies.

7. A communication circuit, comprising:
a node configured to couple to an antenna; and
an interface circuit comprises:
    a first radio circuit configured to transmit one or more packets over a first physical layer communication protocol; and
    a second radio circuit, which is separate from the first radio circuit, configured to receive one or more packets over a second physical layer communication protocol that is different from the first physical layer communication protocol; and
wherein the interface circuit is further configured to:
    transmit, via the first radio circuit, a data packet to the receiving device in a first band of frequencies using the first physical layer communication protocol;
    synchronize the first radio circuit and the second radio circuit so that transmitting in the second band of frequencies is enabled concurrently with the transmitting of the data packet; and
    receive, via the second radio circuit, feedback from the receiving device about the communication of the data packet in a second band of frequencies using the second physical layer communication protocol.

8. The communication circuit of claim 7, wherein the feedback includes information associated with a channel-access procedure.

9. The communication circuit of claim 8, wherein the information includes conflict-avoidance information for communication in the second band of frequencies.

10. The communication circuit of claim 7, wherein the first radio circuit is configured for unidirectional communication with the receiving device in the first band of frequencies.

11. The communication circuit of claim 7, wherein the second band of frequencies includes interference sources during communication between the transmitting device and the receiving device; and
wherein the first radio circuit is configured to exclude the interference sources from the first band of frequencies during communication between the transmitting device and the receiving device.

12. The communication circuit of claim 7, wherein frequencies in the first band of frequencies are higher than frequencies in the second band of frequencies.

13. A method for communicating between a transmitting device and a receiving device, wherein the method comprises:
transmitting, via a first radio circuit in the transmitting device, a data packet to the receiving device in a first band of frequencies using a first physical layer communication protocol;
synchronizing the first radio circuit and a second radio circuit in the transmitting device, which is separate from the first radio circuit, so that transmitting in the second band of frequencies is enabled concurrently with the transmitting of the data packet; and receiving, via the second radio circuit, feedback from the receiving device about communication of the data packet in a second band of frequencies using a second physical layer communication protocol; and wherein the first band of frequencies is different than the second band of frequencies and the first physical layer communication protocol is different from the second physical layer communication protocol.

14. The method of claim 13, wherein the feedback includes conflict-avoidance information associated with a channel-access procedure for communication in the second band of frequencies.

15. The method of claim 13, wherein communication between the first radio circuit and the receiving device is unidirectional.

16. A receiving device comprising:
an antenna; and
an interface circuit, coupled to the antenna, configured to communicate with a transmitting device, wherein the interface circuit comprises:
  a first radio circuit configured to receive one or more packets over a first physical layer communication protocol; and
  a second radio circuit, which is separate from the first radio circuit, configured to transmit one or more packets over a second physical layer communication protocol that is different from the first physical layer communication protocol; and
  wherein the interface circuit is further configured to:
    receive, via the first radio circuit, a data packet from the transmitting device in a first band of frequencies using the first physical layer communication protocol;
    synchronize the first radio circuit and a second radio circuit in the receiving device, so that receiving in a second band of frequencies is enabled concurrently with the receiving of the data packet; and
    transmit, via the second radio circuit, feedback to the transmitting device about the communication of the data packet in the second band of frequencies using the second physical layer communication protocol, the feedback including a common acknowledgment for communication in the first band of frequencies and the second band of frequencies.

17. The receiving device of claim 16, wherein the feedback includes information associated with a channel-access procedure.

18. The receiving device of claim 17, wherein the information includes conflict-avoidance information for communication in the second band of frequencies.

19. The receiving device of claim 16, wherein the second band of frequencies includes interference sources during communication between the transmitting device and the receiving device; and
wherein the first radio circuit is configured to exclude the interference sources from the first band of frequencies during communication between the transmitting device and the receiving device.

20. The receiving device of claim 16, wherein frequencies in the first band of frequencies are higher than frequencies in the second band of frequencies.

21. The receiving device of claim 16, wherein transmitting the feedback involves one of: scheduled access to the second band of frequencies, and random access to the second band of frequencies.

22. A communication circuit, comprising:
a node configured to couple to an antenna; and
an interface circuit that comprises:
  a first radio circuit configured to receive one or more packets over a first physical layer communication protocol; and
  a second radio circuit, which is separate from the first radio circuit, configured to transmit one or more packets over a second physical layer communication protocol that is different from the first physical layer communication protocol; and wherein the interface circuit is further configured to:
    receive, via the first radio circuit, a data packet from the transmitting device in a first band of frequencies using the first physical layer communication protocol;
    synchronize the first radio circuit and a second radio circuit in the communication circuit, so that receiving in a second band of frequencies is enabled concurrently with the receiving of the data packet; and
    transmit, via the second radio circuit, feedback to the transmitting device about the communication of the data packet in the second band of frequencies using the second physical layer communication the feedback including a common acknowledgment for communication in the first band of frequencies and the second band of frequencies.

23. The communication circuit of claim 21, wherein the feedback includes information associated with a channel-access procedure.

24. The communication circuit of claim 22, wherein the information includes conflict-avoidance information for communication in the second band of frequencies.

25. The communication circuit of claim 22, wherein the second band of frequencies includes interference sources during communication between the transmitting device and the receiving device; and
wherein the first radio circuit is configured to exclude the interference sources from the first band of frequencies during communication between the transmitting device and the receiving device.

26. The communication circuit of claim 22, wherein frequencies in the first band of frequencies are higher than frequencies in the second band of frequencies.

27. The transmitting device of claim 22, wherein transmitting the feedback involves one of: scheduled access to the second band of frequencies, and random access to the second band of frequencies.

28. A method for communicating between a transmitting device and a receiving device, wherein the method comprises:
receiving via a first radio circuit in the receiving device, a data packet from the transmitting device in a first band of frequencies using a first physical layer communication protocol;
synchronize the first radio circuit and a second radio circuit in the receiving device, which is separate from the first radio circuit, so that receiving in a second band of frequencies is enabled concurrently with the receiving of the data packet; and
transmitting, via a second radio circuit in the transmitting device that is separate from the first radio circuit, feedback to the transmitting device about communication of the data packet in the second hand of frequencies using a second physical layer communication protocol, the feedback including a common acknowledgment for communication in the first band of frequencies and the second band of frequencies; and wherein the first band of frequencies is different than the second band of frequencies and the first physical layer communication protocol is different from the second physical layer communication protocol.

29. The method of claim 26, wherein the feedback includes conflict-avoidance information associated with a channel-access procedure for communication in the second band of frequencies.

30. The transmitting device of claim 26, wherein transmitting the feedback involves one of: scheduled access to the second band of frequencies, and random access to the second band of frequencies.

* * * * *